United States Patent
Deck et al.

(10) Patent No.: US 7,103,453 B2
(45) Date of Patent: Sep. 5, 2006

(54) INSTALLATION OF A PROTECTIVE FUNCTION IN A PROTECTIVE DEVICE FOR AN ELECTRICAL POWER DISTRIBUTION NETWORK

(75) Inventors: Bernhard Deck, Weilheim (DE); Mario Crevatin, Winterthur (CH); Catherine Körbächer, Baden-Dättwil (CH); Hans-Peter Züger, Hausen (CH); Paul Rudolf, Villigen (CH)

(73) Assignee: ABB Research LTD, Zurich (CH)

( * ) Notice: Subject to any disclaimer, the term of this patent is extended or adjusted under 35 U.S.C. 154(b) by 67 days.

(21) Appl. No.: 10/702,727

(22) Filed: Nov. 7, 2003

(65) Prior Publication Data

US 2004/0098170 A1  May 20, 2004

(30) Foreign Application Priority Data

Nov. 15, 2002  (EP) .................................. 02405982

(51) Int. Cl.
*G05D 11/00* (2006.01)
(52) U.S. Cl. .......................................... 700/292; 361/1
(58) Field of Classification Search ................ 700/292; 361/62, 1; 307/326
See application file for complete search history.

(56) References Cited

U.S. PATENT DOCUMENTS

| | | | | |
|---|---|---|---|---|
| 5,138,712 A | * | 8/1992 | Corbin ........................ | 713/200 |
| 6,167,329 A | * | 12/2000 | Engel et al. ................ | 361/93.2 |
| 6,271,759 B1 | * | 8/2001 | Weinbach et al. .......... | 340/635 |
| 6,442,452 B1 | * | 8/2002 | Kopke ......................... | 700/292 |
| 6,469,629 B1 | * | 10/2002 | Campbell et al. ........... | 340/635 |
| 6,697,240 B1 | * | 2/2004 | Nelson et al. ................ | 361/64 |
| 6,836,396 B1 | * | 12/2004 | Tignor et al. .............. | 361/93.3 |
| 2004/0099639 A1 | * | 5/2004 | Valdermarsson et al. ... | 218/118 |

FOREIGN PATENT DOCUMENTS

| | | |
|---|---|---|
| DE | 197 22 898 | 12/1998 |
| EP | 0 853 367 | 7/1998 |
| EP | 0 935 327 | 8/1999 |
| EP | 1 189 324 | 3/2002 |

* cited by examiner

*Primary Examiner*—Leo Picard
*Assistant Examiner*—Alexander Kosowski
(74) *Attorney, Agent, or Firm*—Buchanan Ingersoll & Rooney PC

(57) ABSTRACT

A method for installation of a programmable protective function in a protective device for an electrical power distribution network, with the protective device having means for processing measured values from measurement appliances for the power distribution network, and having means for initiating switching commands by primary appliances for the power distribution network, and the protective function determining the switching commands on the basis of the measured values, when it is carried out, has the following steps:

transmission of a description of the protective function from a remote function server via a communication link to the protective device,
  loading of the description in the protective device, and
  implementation of the loaded description of the protective function.

A protective device according to the invention has means for receiving a description of a protective function via a communication link from a remote function server and has means for loading the description, wherein the loaded description of the protective function can be carried out in the protective device.

13 Claims, 2 Drawing Sheets

INSTALLATION OF A PROTECTIVE FUNCTION IN A PROTECTIVE DEVICE FOR AN ELECTRICAL POWER DISTRIBUTION NETWORK

TECHNICAL FIELD

The invention relates to the field of system management, in particular system management for high-voltage, medium-voltage or low-voltage switchgear assemblies. It relates to a method for installation of a programmable protective function in a protective device for an electrical power distribution network as claimed in the precharacterizing clause of patent claim 1, to a protective device as claimed in the precharacterizing clause of patent claim 7, to a substation as claimed in the precharacterizing clause of patent claim 9, and to a computer program for evaluation of a licence status for a protective device.

PRIOR ART

A system, in particular a high-voltage or medium-voltage switchgear assembly, is controlled by means of a distributed control system comprising field controllers which are connected to one another via communication buses. A control system has, for example, field controllers and a control station, as well as various communication buses and bus couplers. The controllers control, regulate, monitor and protect primary appliances in the system, which carry out the actual system purpose. Primary appliances are, for example, circuit breakers, isolators, overhead lines, transformers, generators or motors.

Protective functions monitor the correct operation of the system. Protective functions are, for example, overcurrent protection, distance protection or differential protection on the basis of current or phase signals. If, for example, a fault such as a short circuit is detected then, typically, one line is disconnected from the network. Faults resulting from external influences or from a failure of a system part must be detected with a very high degree of reliability. In some applications, however, it is absolutely essential to avoid disconnections resulting from incorrectly identified faults. In order to satisfy these contradictory requirements, appropriate protective functions are highly complex and require a large amount of development effort. In other applications, less complex protective functions are sufficient. The costs for a protective device are governed by the costs of the installed protective function.

Over the course of the life of a switchgear assembly and of the associated protective devices, the protection requirements may change. For example, the transmitted power may be increased, or the safety requirements of the network operator may change. Adapted protective functions must then, according to the prior art, be installed in situ by a service technician on the protective device.

DESCRIPTION OF THE INVENTION

The object of the invention is therefore to provide a method for installation of a programmable protective function in a protective device for an electrical power distribution network of the type mentioned initially, which allows simplified and more flexible installation. A further object of the invention is to provide a protective device, a substation and a computer program which allow the method according to the invention to be carried out.

This object is achieved by a method for installation of a programmable protective function in a protective device for an electrical power distribution network, by a protective device, by a substation and by a computer program having the features of the independent claims.

The method according to the invention for installation of a programmable protective function in a protective device for an electrical power distribution network has the following steps:
   transmission of a description of the protective function from a remote function server via a communication link to the protective device,
   loading of the description in the protective device, and
   implementation of the loaded description of the protective function.

The protective device according to the invention has means for receiving a description of a protective function via a communication link from a remote function server, and has means for loading the description, wherein the loaded description of the protective function can be carried out in the protective device.

The method and protective device according to the invention make it possible to install protective functions automatically in a physically remote function server without an operator having to travel to the protective device. This in turn makes it economically possible to install protective functions, and to licence their use, for a limited time period.

In one preferred variant of the method, a licence management means exists, which determines a licence status for the protective device. Use of the protective function, that is to say the transmission, the loading or implementation of the description of the protective function, is made dependent on the licence status.

It is thus possible to use protective functions flexibly and in accordance with the changing requirements of a system operator.

When it is being run, a computer program for evaluation of the licence status carries out the following steps:
   selection of a protective function on the basis of a license status,
   transmission of a description of the protective function to the protective device (1), and
   allowing use of the protective function.

Further preferred embodiments are described in the dependent patent claims.

BRIEF DESCRIPTION OF THE DRAWINGS

The subject matter of the invention will be explained in more detail in the following text with reference to preferred exemplary embodiments, which are illustrated in the attached drawings, in which.

The reference symbols that are used in the drawings, and their meanings, are listed in summary form in the list of reference symbols. In principle, identical parts are provided with the same reference symbols in the figures.

Approaches to Implementation of the Invention

Figure 1:
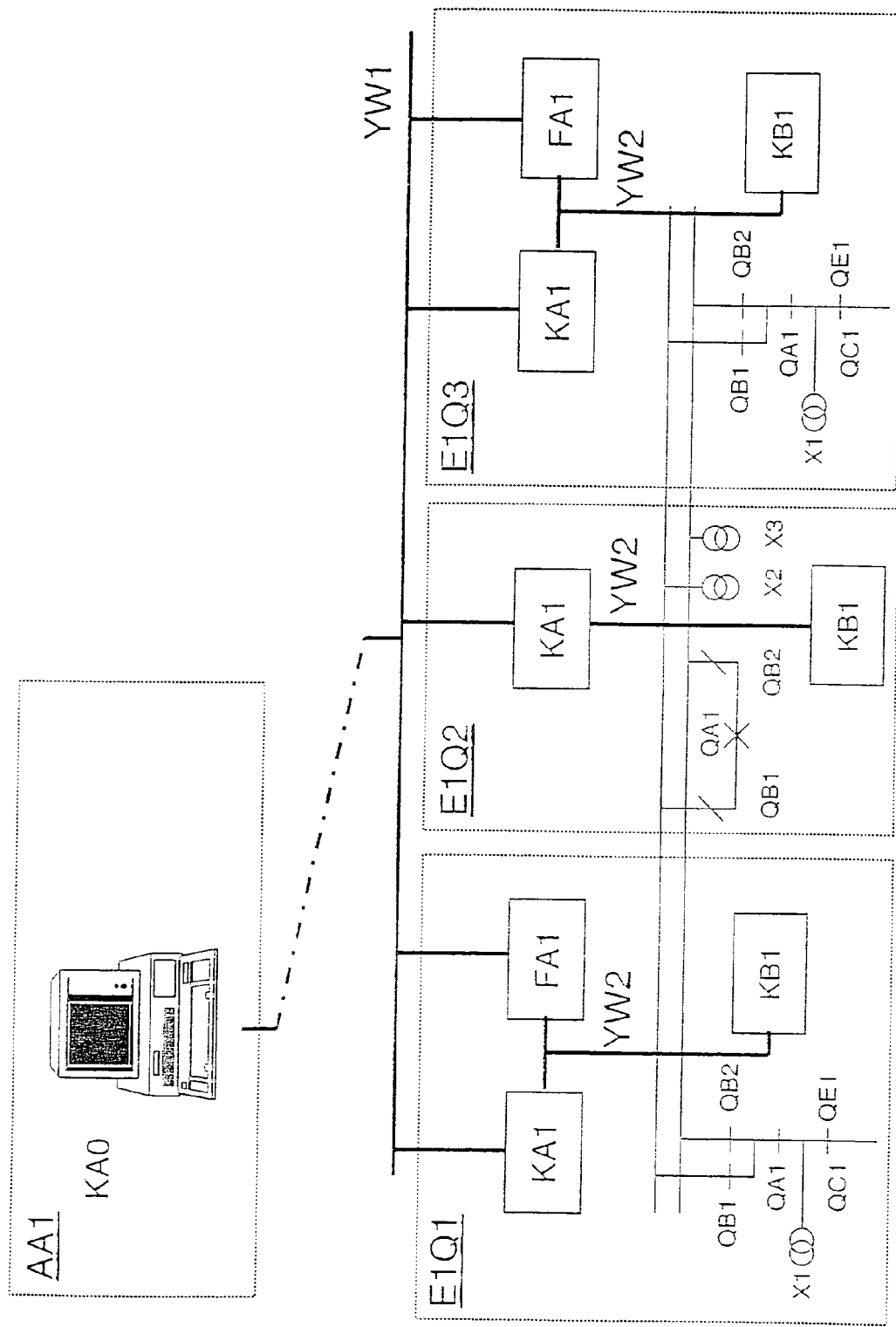
FIG. 1 shows a schematic illustration of a switchgear assembly and of an associated control system.

FIG. 1 shows a schematic illustration of a switchgear assembly or substation for an electrical power distribution network, and an associated control system. The illustration shows three fields E1Q1, E1Q2 and E1Q3 for a switchgear assembly, and a control station AA1 with a data processing appliance KA0 with the normal input and output means for control by a user. The control station AA1 is arranged in the substation itself, or is arranged remotely in a network operator control center, and is connected via a communication network to a higher-level bus YW1 for the substation. The individual fields E1Q1, E1Q2 and E1Q3 each have control appliances, which are controllers KA1, protective devices FA1 or input/output appliances KB1.

The designations KA1, FA1, KB1, YW1, etc. denote actual appliances and control system functions for a switchgear assembly. In order to designate a specific appliance uniquely, it is preceded by the designation of the field. Thus, for example, E1Q1QA1 denotes a switch QA1 in the field E1Q1.

Control system functions for controlling and monitoring the primary appliances are installed in the control appliances. The control appliances are connected to one another by communication means, in the example by higher-level bus YW1 and by process buses YW2. The control system functions are associated with primary appliances such as switches QA1, isolators QB1, QB2 and voltage sensors or voltage measurement appliances X1, X2, X3. The primary appliances are connected to one another by means of electrical connections which carry power, that is to say, for example, via busbars, field nodes and outgoers.

Figure 2:
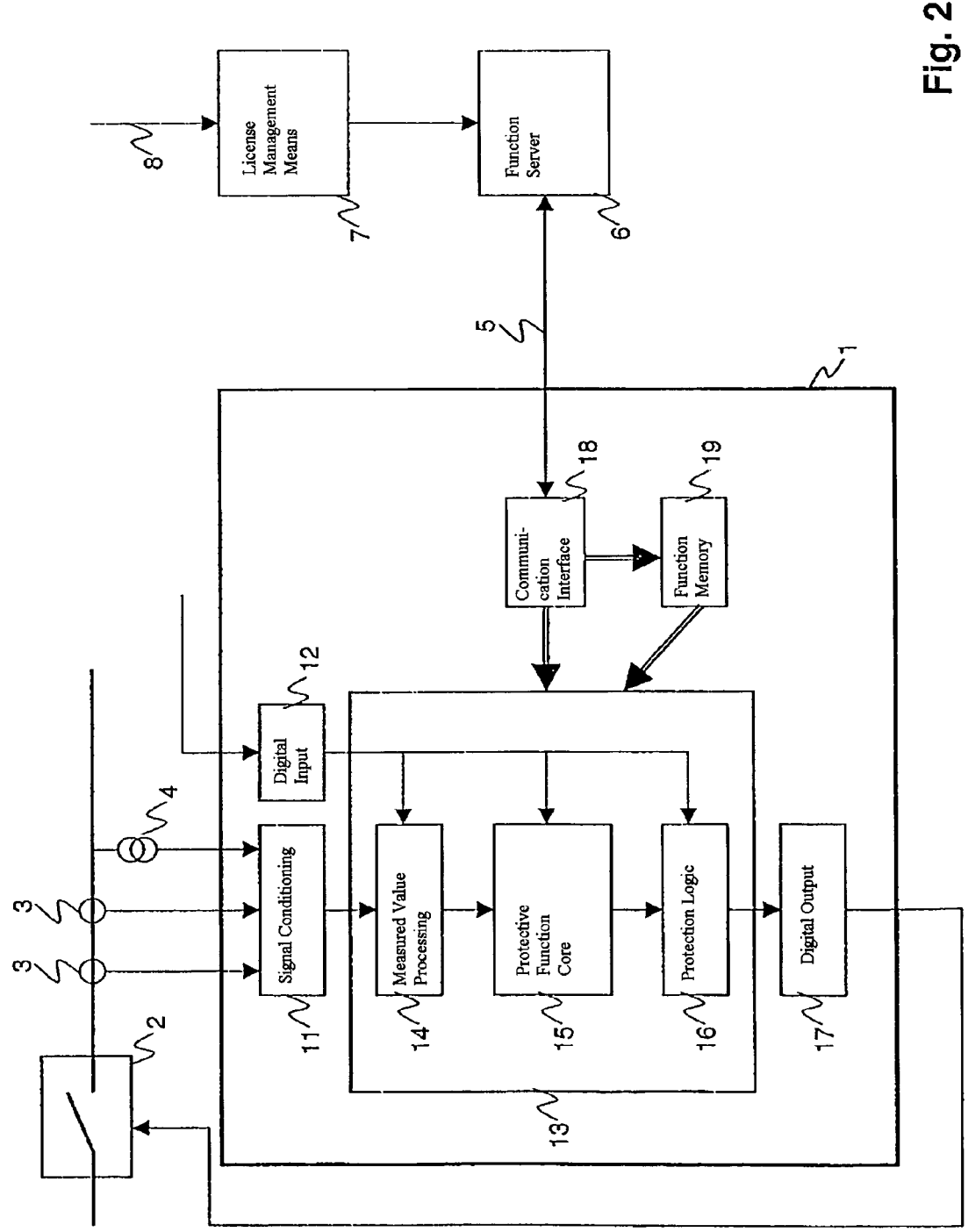
FIG. 2 shows, schematically, a protective device according to the invention and its environment.

FIG. 2 shows a schematic of a protective appliance 1 according to the invention for a substation, and its environment. Signal conditioning 11 detects measurement signals from current measurement appliances 3 and voltage measurement appliances 4 for the power distribution network, in particular for a switchgear assembly. The signal conditioning 11 carries out conditioning and analog/digital conversion of the measurement signals, and transmits corresponding digitally coded measured values to a programmable module 13. The programmable module 13 has measured value processing 14 for filtering measured values and for calculation of, for example, power from the voltage and current. Such filtered and calculated measured values are supplied to a protective function core 15, which implements a more or less complex core for the protective function. Digital inputs 12 for selecting of protective functions or for suppression of switching commands are likewise supplied to the programmable module 13. During operation of the protective device 1, the protective function core 15 determines whether a defect is present and whether a switching command should be sent to an associated primary appliance, in this example a switch 2. A switching command such as this is transmitted to protection logic 16, which optionally links it with other digital signals, in particular with inhibit signals, which can prevent the switching command from being passed on. A corresponding output signal from the protection logic 16 is converted in a digital output 17, and is supplied to the switch 2. This is done, for example, by means of specially associated lines such as optical waveguides, or via a process bus YW2.

In one preferred embodiment of the invention, the protective device 1 has a communication interface 18, which is used for communication with a function server 6 via a communication link 5. The communication link 5 is, for example, a temporary point-to-point link or a connection based on an Internet Protocol such as http, FTP (File Transfer Protocol) or TelNet. The connections are preferably based on the known TCP/IP protocol. The function server 6 stores two or more different protective functions which can be transmitted to the protective device 1, can be loaded in the programmable module 13 and can be implemented via the communication link 5, on the basis of a license status. In one preferred embodiment of the invention, the license status is determined, managed and, if required, transmitted to the function server 6 by means of a license management means 7. For each protective device 1 that is affected, the license status includes the information as to what protective function should be implemented and may be used in what time period, that is to say between predetermined start and end times.

The license management means 7 is a computer program for determination and management of the license status, and preferably offers a user interface 8 for modification of the license status. In one preferred embodiment of the invention, the user interface 8 is accessible via a communication network, for example the Internet or World Wide Web, to a network operator. In this case, the selection of a specific protective function is linked to payment of a license fee: the license status for the protective function allows the protective function to be used, that is to say transmission of the description of the protective function to the protective device 1 and/or loading of the description into the programmable module 13, only if the license management means 7 receives confirmation of payment of the license fee.

The function server 6 and the license management means 7 are each implemented as computer programs in different or in the same data processing unit or units and with associated data memories. They are preferably under the control of and in the premises of a manufacturer of the protective device 1, and are provided with new protective functions by this manufacturer.

In one preferred embodiment of the invention, the protective device 1 has a function memory 19 in which one or more descriptions of protective functions can be stored. This allows a loaded protective function to be replaced by loading a different protective function that is stored in the function memory 19, without any need to transmit the protective functions via the communication link 5. A command to replace the protective functions can in this case be initiated either locally on the protective device or by remote control via the control station KA0, or via the communication link 5. However, a command such as this can also be initiated, for example, on a time-controlled basis: in consequence, a protective function can be transmitted via the communication link 5, can be stored in the function memory 19 and can be loaded into the programmable module 13 only at a predetermined time. In a further preferred embodiment of the invention, the function memory 19 is used to store a basic protective function which implements a predetermined minimum protection. If the license for a loaded protective function has elapsed on the basis of a license status, the basic protective function is loaded automatically.

In preferred embodiment of the invention, the programmable module 13 has a digital computer with a program memory, and the description of the protective function is a computer program which can be loaded in the program memory in order to carry it out. The individual blocks comprising the measured value processing 14, protective function core 15 and the protection logic 16 for the protective function are each implemented by a part of this computer program.

In another preferred embodiment of the invention, the programmable module 13 has a programmable digital logic module, which typically operates at least partially on an unclocked basis. This is, for example, an FPGA (Field Programmable Gate Array), a PLA (Programmable Logic Array) or a CPLD (Complex Programmable Logic Device). The description of the protective function on the basis of the individual blocks 14, 15, 16 in this case is in a standard hardware description language such as VHDL (VHSIC Hardware Description Language), Verilog or System-C. In another preferred embodiment of the invention, the individual blocks of the protective function are described by a bit stream. The bit stream is loaded in a known manner into the programmable logic 13 or the FPGA or CPLD, in order to cause it to implement a specific hardware design on the basis of the desired function.

In a further preferred embodiment of the invention, the signal conditioning 11 and/or the digital output 17 are/is not part of the protective device 1, but are/is implemented in separate appliances. These separate appliances transmit the digitally coded measured values to the measured value processing 14, and receive the output signals from the protection logic 16, for example via a process bus YW2.

A computer program for evaluation of the license status implements the function of the function server 6, and, when run, carries out the following steps:
- selection of a protective function on the basis of the license status received from the license management means 7,
- transmission of a description of the protective function to the protective device 1, and
- allowing use of the protective function.

In this case, use is allowed either by transmission of the license status, in particular with the start time for use, at which time the protective device 1 automatically loads the description of the protective function from the function memory 19. However, alternatively, use is allowed after transmission of an appropriate enable command from the function server 6 to the protective device 1. The enable command can be produced together with the transmission of the description of the protective function, or else at a considerably later time.

The computer program for evaluation of the license status can be loaded into an internal memory for a digital data processing unit and has computer program code means which, when they are run in a digital data processing unit, cause it to carry out the method according to the invention. In one preferred embodiment of the invention, a corresponding computer program product has a computer-legible medium on which the computer program code means are stored.

A data processing device for evaluation of the license status has a data processor, a memory which is connected to the data processor, and computer program code means, which are stored in the memory.

| List of reference symbols | |
|---|---|
| 1 | Protective device |
| 2 | Primary appliance, switch |
| 3 | Current measurement appliance |
| 4 | Voltage measure appliance |
| 5 | Communication link |
| 6 | Function server |
| 7 | License management means |
| 8 | User interface |
| 11 | Analog input, signal conditioning |
| 12 | Digital input |
| 13 | Programmable module |
| 14 | Measured value processing |
| 15 | Protective function core |
| 16 | Protection logic |
| 17 | Digital output |
| 18 | Communication interface |
| 19 | Function memory |
| QA1 | Switch |
| QB1 | Isolator |

-continued

| List of reference symbols | |
|---|---|
| X1, X2, X3 | Voltage sensors |
| YW1 | High-level bus |
| YW2 | Process bus |
| KA1 | Controller |
| FA1 | Protective appliance |
| KB1 | Input/output appliance |

What is claimed is:

1. A method for installation of a programmable protective function in a protective device for an electrical power distribution network, with the protective device having means for processing measured values from measurement appliances for the power distribution network, and having means for initiating switching commands by primary appliances for the power distribution network, and the protective function determining the switching commands on the basis of the measured values, when it is carried out, wherein the method has the following steps:
- transmission of a description of the protective function from a remote function server via a communication link to the protective device,
- loading of the description in the protective device, and
- implementation of the loaded description of the protective function, wherein a license management means exists, which determines a license status of the protective device, and wherein use of the protective function is dependent on the license status, wherein the use of the protective function comprises one of the group consisting of the transmission of the description of the protective function, the loading of the description of the protective function, and the implementation of the description of the protective function, and wherein, if the license status does not allow the use of a protective function, a basic protective function which implements predetermined protection can be carried out.

2. The method as claimed in claim 1, wherein the description of the protective function comprises measured value processing, protective function core and protection logic.

3. The method as claimed in claim 1, wherein the license status includes use of the protective function for a predetermined time period.

4. The method as claimed in claim 3, wherein the license management means allows a change to the license status by an operator of the substation via a user interface.

5. The method as claimed in claim 1, wherein switching between the protective function and the basic protective function is remotely controlled.

6. The method as claimed in claim 5, wherein the license management means allows a change to the license status by an operator of the substation via a user interface.

7. The method as claimed in claim 1, wherein the license management means allows a change to the license status by an operator of the substation via a user interface.

8. A protective device for an electrical power distribution network, wherein the protective device has means for processing measured values from measurement appliances for the power distribution network, means for initiating switching commands by primary appliances for the power distribution network, as well as a programmable protective function which, when carried out, determines the switching commands on the basis of the measured values, wherein the protective device has means for receiving a description of a protective function via a communication link from a remote function server, and has means for loading the description, wherein the loaded description of the protective function can be carried out in the protective device, wherein the protective device has means for storing a basic protective function, and means for selectively loading and carrying out either the protective function or the basic protective function, and wherein the basic protective function is loaded automatically if a license for a loaded protective function has lapsed on the basis of a license status.

9. The protective device as claimed in claim 8, wherein the description of the protective function comprises measured value processing, protective function core and protection logic.

10. The protective device as claimed in claim 8, wherein means for remotely controlling the switching between the protective function and the basic protective function are present.

11. A substation for an electrical power distribution network having a protective device, which protective device has means for processing measured values from measurement appliances for the power distribution network, means for initiating switching commands by primary appliances for the power distribution network, as well as a programmable protective function which, when carried out, determines the switching commands on the basis of the measured values, wherein the protective device has means for receiving a description of a protective function via a communication link from a remote function sever, and has means for loading the description, wherein the loaded description of the protective function can be carried out in the protective device, wherein the protective device has means for storing a basic protective function, and means for selectively loading and carrying out either the protective function or the basic protective function, and wherein the basic protective function is loaded automatically if a license for a loaded protective function has lapsed on the basis of a license status.

12. The substation as claimed in claim 11, wherein means for remotely controlling the switching between the protective function and the basic function are present.

13. A computer program for evaluation of a license status of a protective device for an electrical power distribution network, which can be loaded and carried out on a data processing unit, wherein, when it is being run, the computer program carries out the following steps:
- selection of a protective function on the basis of a license status,
- transmission of a description of the protective function to the protective device, and
- allowing use of the protective function only if the computer program receives confirmation of payment of a license fee and allowing use of a basic protective function automatically, if a license for a loaded protective function has lapsed on the basis of a license status.

* * * * *